US009741087B2

(12) United States Patent
Decker (10) Patent No.: US 9,741,087 B2
(45) Date of Patent: *Aug. 22, 2017

(54) PARALLEL IMAGE PROCESSING METHOD AND SYSTEM

(71) Applicant: Harris Corporation, Melbourne, FL (US)

(72) Inventor: Michael C. Decker, Brockport, NY (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/130,150

(22) Filed: Apr. 15, 2016

(65) Prior Publication Data

US 2016/0232642 A1     Aug. 11, 2016

Related U.S. Application Data

(63) Continuation of application No. 14/145,219, filed on Dec. 31, 2013, now Pat. No. 9,317,889.

(51) Int. Cl.
*G06T 1/20* (2006.01)

(52) U.S. Cl.
CPC ..................................... *G06T 1/20* (2013.01)

(58) Field of Classification Search
None
See application file for complete search history.

*Primary Examiner* — Vu Nguyen
(74) *Attorney, Agent, or Firm* — Davidson Berquist Jackson & Gowdey LLP (57) ABSTRACT

A hybrid processing-based image processing system performs image chain flattening, token queue creation and pipeline prior to image rendering in order to allow various portions of the image processing to be performed in parallel. Tokens are passed between the filters of the pipeline generated from the flattened image chain to allow order-preserving operations to be performed which result in the same image as would have been produced by the original image chain using sequential processing.

20 Claims, 12 Drawing Sheets

Figure 10A writeImage( cropImage( readImage("inputfile"), 64, 64, 256, 256), "outputfile")

```
writeImage(
    superimpose (
        expandImage(
            cropImage( readImage("inputfile1"), 50, 50, 128, 128),
            2),
        cropImage( readImage("inputfile2"), 100, 200, 256, 256),
    "superimposed_outputfile")
)
```

```
writeImage(
    merge(
        expandImage(
            cropImage( readImage("inputfile1"), 50, 50, 128, 128),
            2),
        cropImage( readImage("inputfile2"), 100, 200, 256, 256),
    "superimposed_outputfile")
)
```

PARALLEL IMAGE PROCESSING METHOD AND SYSTEM

FIELD OF INVENTION

The present invention is directed to an image processing method and system, and, in one embodiment, to an image processing method and system that utilize parallel processing of tiles in an image to increase image processing throughput.

BACKGROUND

Figure 1:
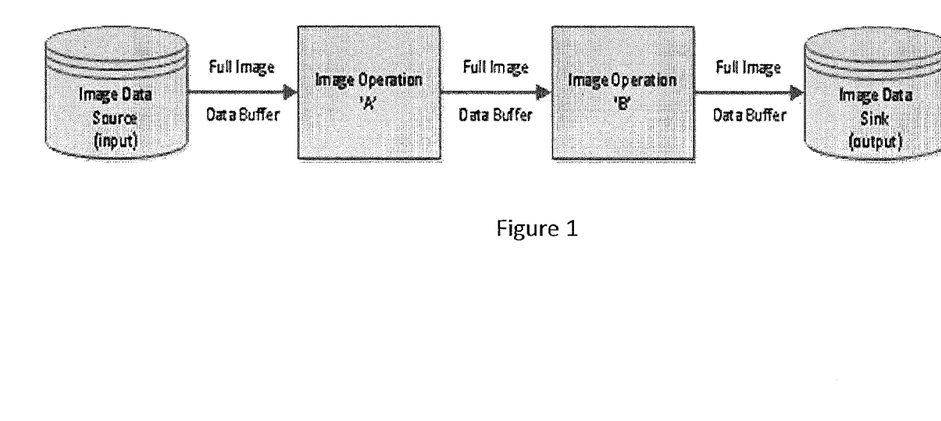
FIG. 1 is data flow diagram showing a known push model of image processing.

Known image processing systems have performed image processing using either a push model or a pull model. As shown in FIG. 1, in a push model all source data is pushed from the source (also referred to as an "input" (e.g., the original source image)) to the sink (also referred to as the output or a resulting processed image). In such a configuration, the image data is 'pushed' through the image chain from the source(s) to the sink by: (a) fetching the image data (usually from disk) and storing the image data in an internal memory buffer; (2) applying each of the image processing operations sequentially (from the source to the sink); and (3) storing the resultant image data to disk and/or display on a monitor.

However, known push models have known limitations which can detract from their usefulness under certain conditions. For example, if an image to be processed is very large as compared to the available RAM, then intermediate results may need to be written to disk, thus incurring performance (time) and hard drive usage penalties. Similarly, when image data is sequentially processed in its entirety from source to sink, it may be difficult to concurrently process (thread) smaller chunks in order to optimize performance (time). Likewise, the push model may not work well for interactive applications.

INTEL™ Threading Building Blocks (TBB) is a toolkit for writing parallel programs. TBB contains a pipelining capability, which is a common parallel pattern that mimics a traditional manufacturing assembly line. Using such pipelining, data has traditionally flowed from the source to the sink. TBB also only supports linear pipelines (no branching is allowed in the chain).

Figure 2:
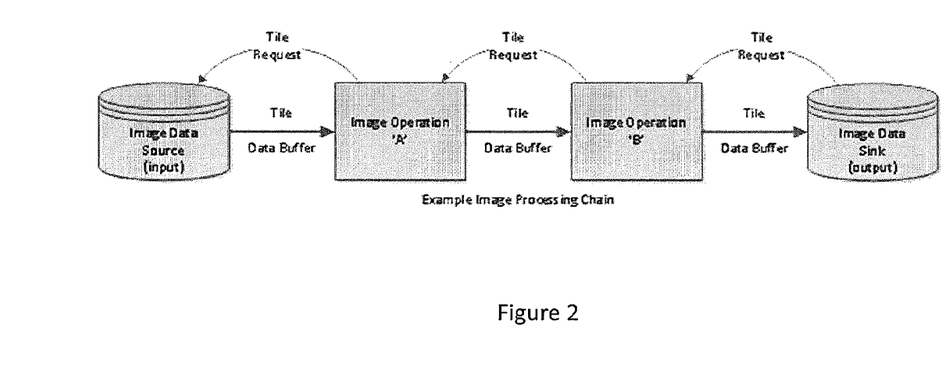
FIG. 2 is data flow diagram showing a known demand-pull model of image processing.

Unlike the push model, the demand-pull model, as shown in FIG. 2, processes image data in response to a request for a smaller image 'chunk' known as a tile and is, therefore, more complicated than the push model. The demand for a tile of image data moves from the sink up through the operators (i.e., the operations to be performed on the image) and then finally to the source. The source retrieves the requested tile of image data into memory, possibly from a disk file. The tile then flows down from the source to the sink, passing through each of the operators where the image data is processed. While the pull model may reduce the overall memory footprint by using smaller chunks of the image, called tiles, which can sometimes be concurrently processed and/or cached, the pull model also comes with additional complexities and/or disadvantages. For example, software for managing the concurrency (multiple threads) of work being performed often is custom written which adds to the development cost and detracts from the actual task of writing the image processing framework.

BRIEF DESCRIPTION OF THE DRAWINGS

The following description, given with respect to the attached drawings, may be better understood with reference to the non-limiting examples of the drawings, wherein.

DETAILED DISCUSSION

Utilizing the method and system described herein, it is possible to utilize push model processing components in a pull model environment, thereby providing a hybrid processing model. In general, as discussed in greater detail below, the system performs three major pre-processing steps prior to image rendering: (1) image chain flattening, (2) token queue creation and (3) pipeline creation.

Figure 3:
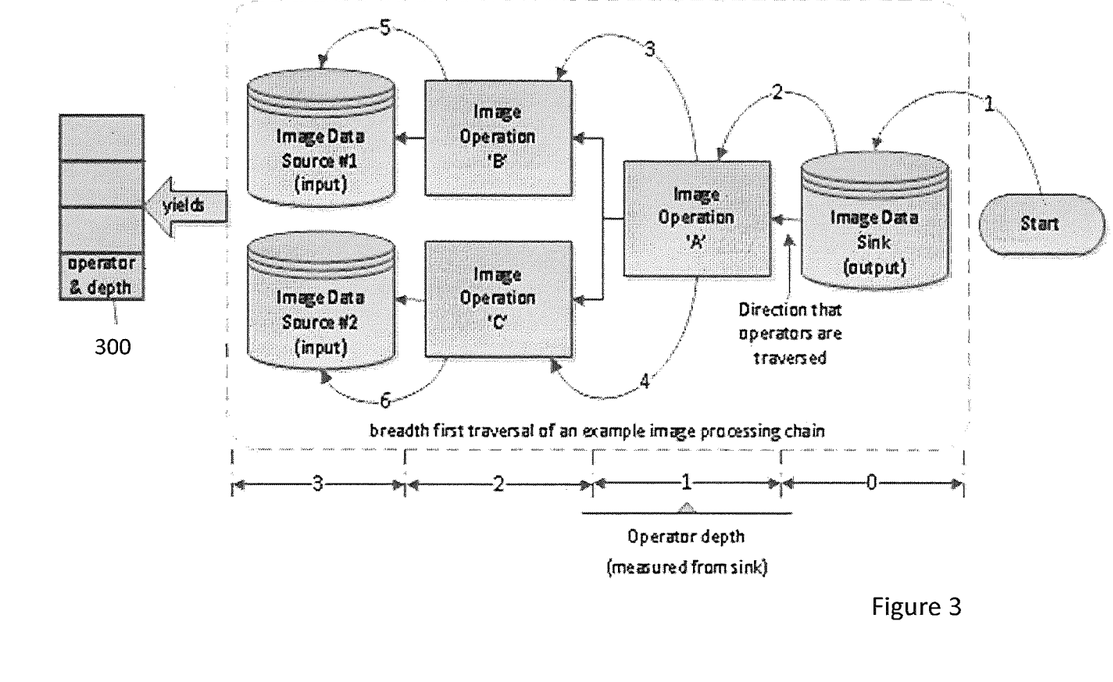
FIG. 3 is a data flow diagram showing a sink-centric image processing system which implements an image processing chain.

In the first pre-processing step, an image processing chain (representing the operations to be performed such that the source inputs are converted to the source outputs) is received by the system and flattened to remove branching, thereby more effectively enabling pipelined processing. An ordered vector 300 (e.g., 1D array) containing the chain's operators paired with a depth value is created where the depth is a non-negative integer distance of the operator from the sink, as shown in FIG. 3. The sink therefore has a depth of zero. The system traverses the operators in a breadth-first manner to preserve operator order in cases where an operator has multiple inputs. In the example of FIG. 3, operator 'A' has two inputs, namely operators 'B' and 'C'. The order that operators are inserted into the pipeline is done first by greatest depth, and then by the reverse order that they appear in the vector of operators. Depth is a rough determination of operator order while the breadth-first traversal provides for finer grained placement after depth is considered. As can be seen in FIG. 3, the original processing chain is produced with reference to the sink as the starting point, as opposed to starting at the source in a typical push model.

In one embodiment, a modified breadth-first search can be used. Traditionally, all nodes at any one level (depth) are visited before moving to the next level. However, in the context of generating operator/depth pairs, a breadth-first traversal can be performed for each operator, independent of other operators that may also be at the same depth. This is done to preserve the order of operators that feed into the current operator being visited. For example, if 'op A' has two inputs (e.g., 'op C' and 'op D'), it may be that for 'op A', 'op C' must come before 'op D', and the modified breadth-first traversal preserves this order.

The maximum depth of each operator also is tracked for use later when creating the pipeline. The operator's maximum depth is required for situations where an operator is an input to multiple other operators.

Figure 4:
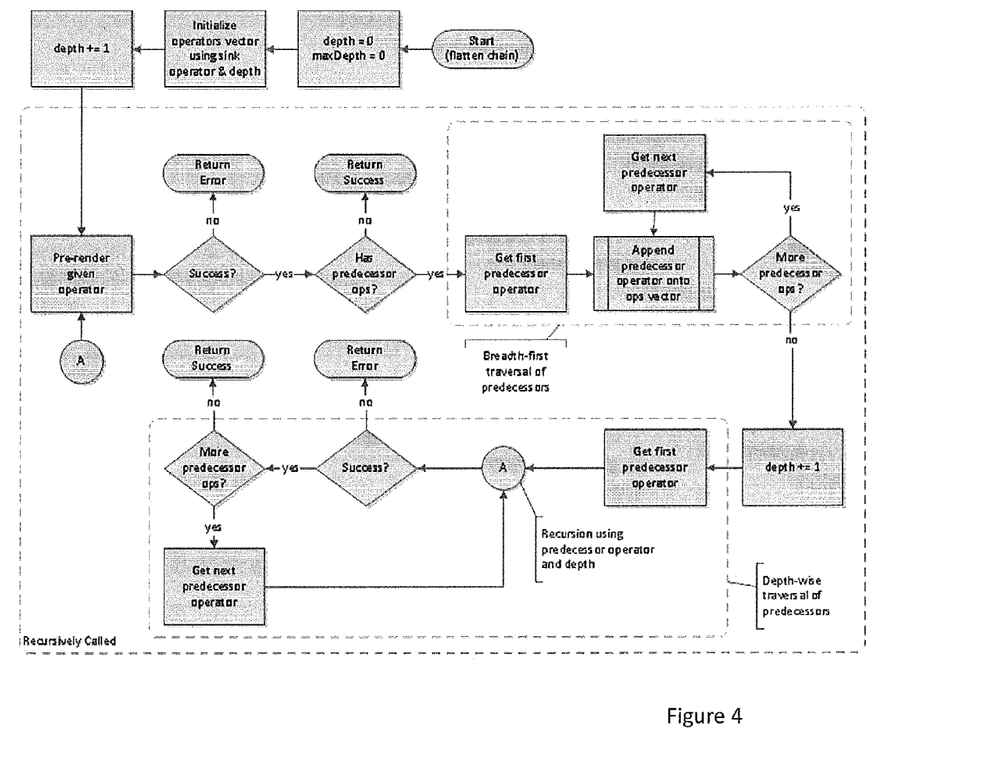
FIG. 4 is a flowchart showing an exemplary method of flattening an image processing chain.

FIG. 4 is a flowchart illustrating an exemplary method of flattening an image processing chain. The order of operators is determined by first traversing the image chain in a breadth-first manner. During this traversal process, operators are paired with the current value for depth and appended onto the end of a vector, as described in greater detail with respect to FIG. 5. After the breadth-first traversal, the depth is incremented by one and the chain is 'walked' by performing a recursive call on each of the current operator's predecessors. Operators are connected to one another in a linked list and predecessors are an operator's upstream inputs. The maximum depth is tracked for use later, when the pipeline is created from the vector of operators.

In one embodiment, a "pre-render( )" method call is performed on each of the operators rather than looping over all operators again later. The use of such a pre-render( )method gives operators the opportunity to prepare themselves for rendering. Some operators, for example, may need to allocate additional memory for intermediate results or may need to perform one-time calculations that are required during rendering. Likewise, in such an embodiment there may be a postRender( ) method that is called to provide operators with the ability to clean-up after rendering has completed.

Figure 5:
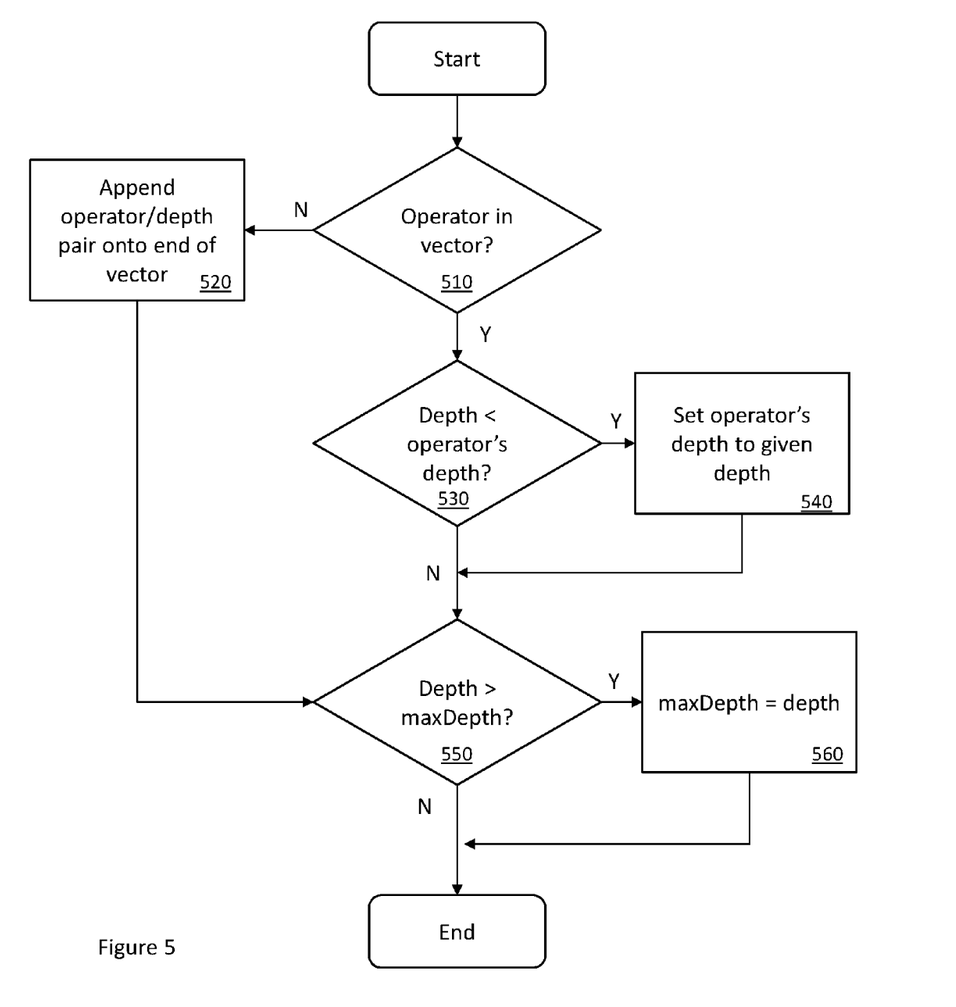
FIG. 5 is a flowchart showing an exemplary method of adding operation/depth pairs to a vector of image processing steps.

As shown in FIG. 5, when an operator/depth pair is to be added to a vector list, the system determines whether the operator is already in the vector, as shown in step 510. If the operator is not already in the vector, then control passes to step 520 where the operator/depth pair is added to the vector. However, if step 510 determines that the operator is already in the vector, the depth of the operator may need to be updated, so control passes to step 530. If step 530 determines that the depth associated with the operator is less than the current depth, then the operator's depth is set to the specified depth within the recursion and control passes to step 550. Once control passes to step 550, from either step 520 or step 540, the system determines if the depth is greater than the maxDepth tracked so far, and, if so, control passes to step 560. After steps 550 and 560, the append process terminates.

As the second step in the pre-processing of images, the system creates a series of tokens that are to be added to a token queue. Individual tokens contain and manage all of the information necessary to generate a single output image tile, which is done by passing the token through a pipeline. Token queues then act as an ordered list of all tokens necessary to generate the entire output image. The token queue is then used by the pipeline by pushing each of the individual tokens through the pipeline.

Figure 6:
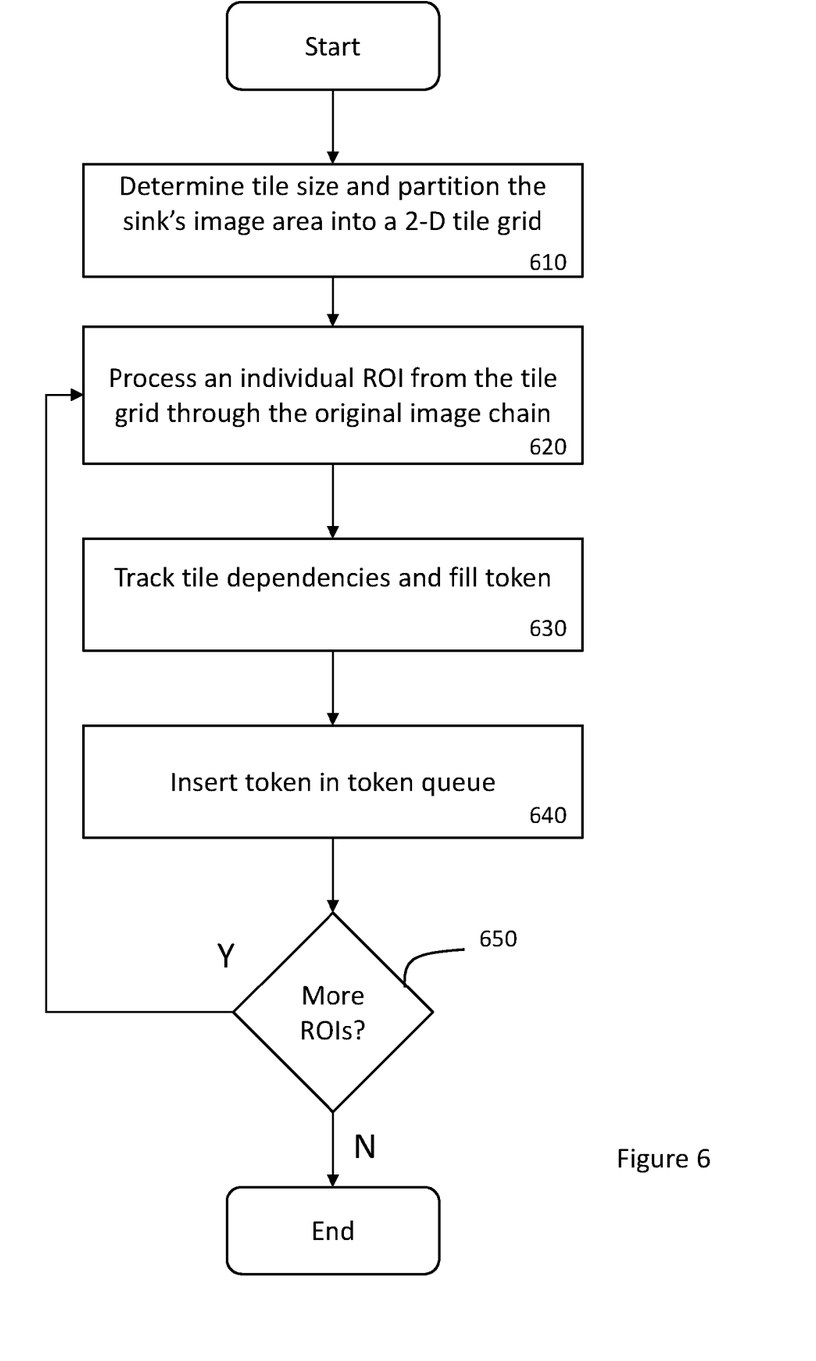
FIG. 6 is a flowchart for generating a token queue and the tokens included therein.

As shown in the exemplary flowchart of FIG. 6, a token queue can be created by generating the tokens necessary for processing and placing them into the token queue. In step 610, a tile size must be selected so that the number of tiles to be processed can be determined. The tile size can either be specified explicitly to the system (e.g., via a configuration file, a command line parameter, or user input) or determined implicitly/dynamically (e.g., by determining an appropriate tile size from an output image size or based on the output characteristics of the output image which may, for example, support concatenated tiles of a fixed or preferred size). Having determined the tile size, the system generates a tile grid (of m columns and n rows) using the tile size and the sink's image size.

In step 620, an initially empty token is created, a unique ID is generated and associated with the output tile to be rendered, and a region of interest (ROI) for the tile grid is processed through the operators of the original image chain. (As used herein, a region of interest or an ROI is distinguished from a tile in that a region of interest does not include any image data, only the information needed to generate the image. Once the image data is added to the region of interest, it is treated as a tile.) This processing flows from the sink up to all sources. Each operator within the chain contains the logic necessary to transform a given ROI into its predecessor's coordinate system. This step does not process any image data but rather the ROI's size and position are transformed by each of the operators that the ROI passes through. The exact transformation is dependent on the functionality of each of the operators, examples of which will be discussed in greater detail below.

In step 630, tile dependencies are tracked along with other information for each of the operators that are visited within the processing chain, and the tracked information is stored within the token for subsequent use. The system further cross-references the operator's result tile ID with the IDs of the operator's input tiles. This enables operators at render time to take one or more intermediate tiles as input(s) and generate another single tile as an intermediate result. These intermediate tiles represent the current result at a specific point in the pipeline. Intermediate tiles are stored in (and retrieved from) a tile cache. Each token manages its own tile cache as it moves through the pipeline.

In step 640, the token generated and filled in steps 620 and 630 is inserted into the token queue, and control passes to step 650. In step 650, the system determines if there are more ROIs within the tile grid generated in step 610, and, if so, control passes back to step 620 to process the next ROI.

Figure 7:
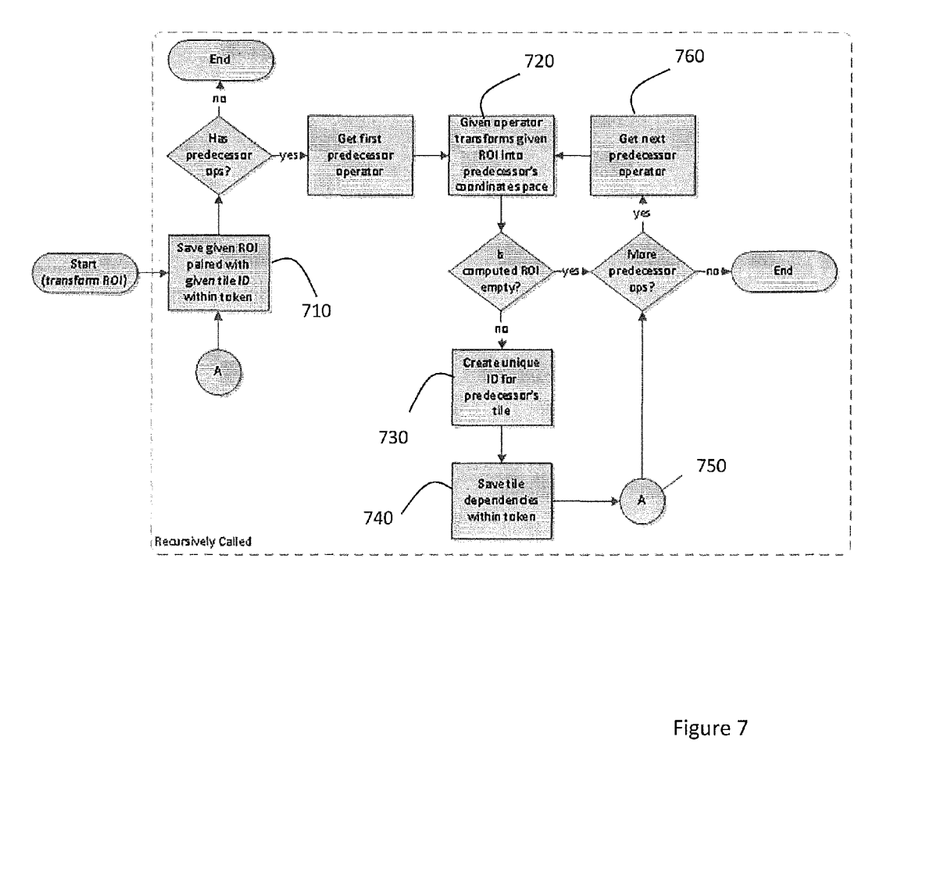
FIG. 7 is flowchart showing the creation of tokens.

According to the steps of FIG. 6, the system fills in the token with its information, and that process can be performed recursively to traverse the chain of operators/filters. As shown in FIG. 7, in step 710, the system initially saves a given ROI and a given tile ID within the token. Then, for each predecessor operator, if any, the system performs four main sub-steps. First, in step 720 the given ROI is transformed into the coordinate space of the current predecessor operator. Each operator contains the logic to perform this transformation which produces a new ROI. Second, if the computed ROI is not empty, a new unique ID is created in step 730 for the intermediate tile corresponding to the new transformed ROI. Third, in step 740 the new ID is saved as a dependency for creating the tile corresponding to the given tile ID. Most operators produce an intermediate tile as a result and require intermediate tiles as inputs to do this. The IDs for these intermediate inputs need to be cross referenced with the intermediate tile being produced by the operator. These IDs are used to retrieve and store intermediate tiles from/to the token's tile cache. Fourth, in step 750 the token filling function is again invoked recursively using the current predecessor tile, the new transformed ROI and the new ID for the intermediate input tile (and arriving again at step 710, but recursively, and opposed to sequentially). If there are additional predecessor operations after the recursive processing, then step 760 gets the next predecessor operator and transfers control back to step 720 so that the loop of steps 720-750 can be repeated for the next predecessor operator.

Figure 8:
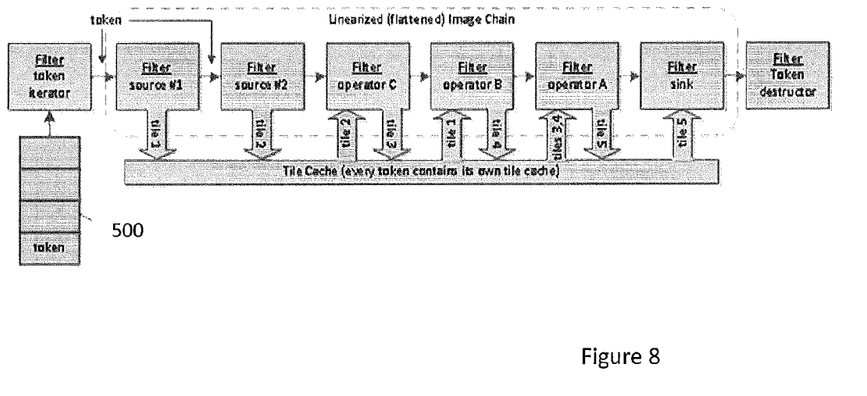
FIG. 8 is a block diagram showing a pipeline processing a token queue.

Once the token queue and vector of operators are generated, then a processing pipeline, such as shown in the example of FIG. 8, can be constructed. Each "node" within the pipeline is referred to as a "filter." In general, data flows through a series of pipeline filters and each filter processes or acts on the data in some way. By using the previously generated tokens as the data, a pipeline can be created to perform parallel image processing.

The system can utilize a variety of filters, such as token iterator filters, token destructor filters and operator filters. Typically, the token iterator filter is the first filter and there is only one instance of this filter type within a pipeline. The token iterator filter controls the pipeline by pulling individual tokens from the token queue and forwarding them on to the next filter. When the token queue is empty, this filter signals the pipeline that there is no more data.

Like the token iterator filter, there is generally only a single token destructor filter, but it is the last filter in the pipeline. The token destructor filter destroys the token and its managed data, thus freeing up any memory it may have used.

The most heavily used type of filters is the operator filters, and there are typically multiple instances of this type of filter, with each instance corresponding to each of the operators from the original image chain. Operator filters are ordered using the vector generated during the chain flattening stage. Operator filters perform their work based on the instructions contained in a token. Intermediate tiles required by the operator are pulled from the token's tile cache and the operator's results (output, in the form of a tile) are written back to the same tile cache.

Figure 9:
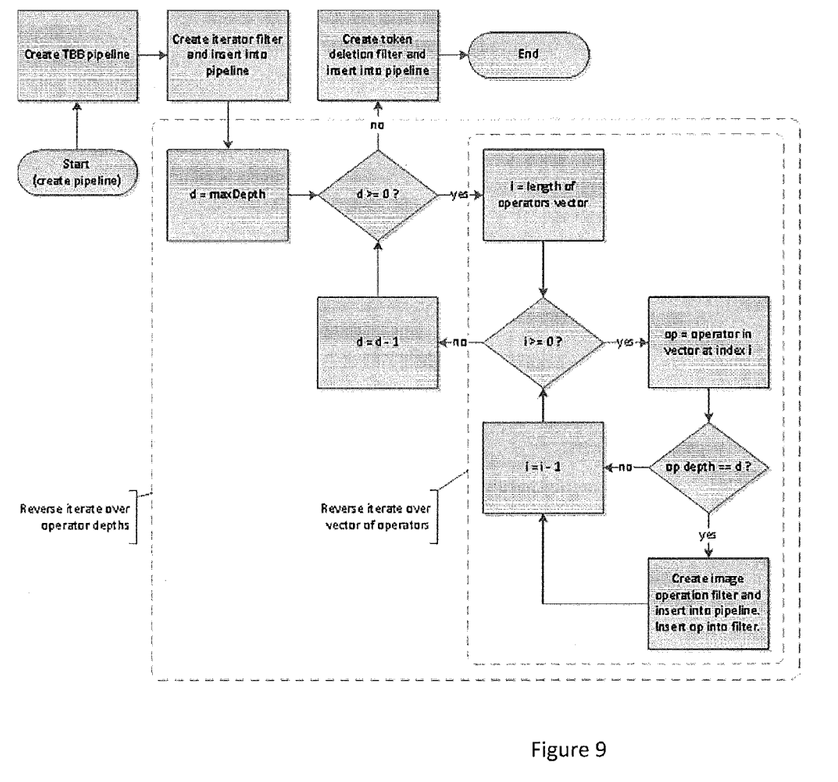
FIG. 9 is a flowchart for generating a pipeline from a series of operations to be performed on a series of tiles.

An exemplary process of generating a pipeline is shown in FIG. 9, and the exemplary pipeline is created using the INTEL TBB libraries. The first filter that is added to the pipeline is the iterator pipeline so that it can control the tokens to be processed by the pipeline. Then, knowing that the system has previously calculated and stored the maximum depth (maxDepth) and the length of the operators vector (i.e., the number of operators in the operators vector), the system can then start at the deepest depth (d=maxDepth) and iterate through all of the operators in the operators vector. For each operator at the current depth level (d), the system can create an image operation filter, insert the operation into the filter and add the filter to the pipeline. Having added all the operation filters at the current level d, the system can then reduce the current depth (d) by one (d=d−1), and, if the current depth (d) is greater than or equal to zero, then the operator iteration process is repeated for the new depth (and subsequently for all depths greater than or equal to zero). At each depth greater than or equal to zero, all filters are added that correspond to that depth. After all depth levels have been processed, the system creates a token deletion filter and inserts it into the pipeline.

Figure 10A:
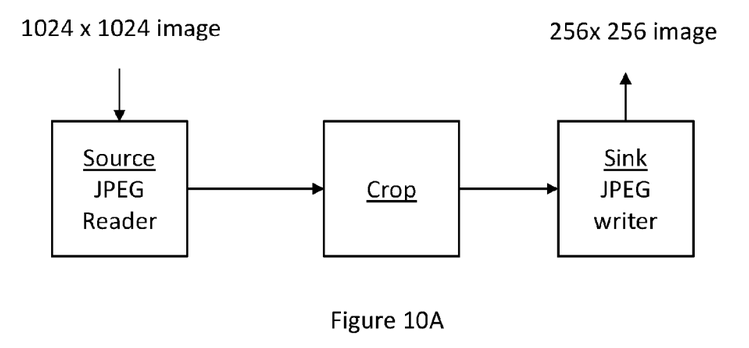
FIG. 10A is a block diagram showing an exemplary processing of an input image to an output image.

As shown in the example of FIG. 10A, an input image is to be read in by a JPEG image reader (which converts the compressed image into a bitmap-style image that can be operated on by the remaining filters). While the illustrated example utilizes an image size of 1024×1024 for simplicity, actual input images are often on the order of gigabytes to terabytes. In the example, the entire image is not to be processed, rather a sub-portion having a selected size (e.g., 256×256) is to be processed, and the sub-portion is to be written to an output file. To achieve this, a crop filter is used that specifies the size of the sub-portion (e.g., 256×256) and the location relative to the image origin where the sub-portion is located (e.g., at point (64, 64)).

Figure 10B:
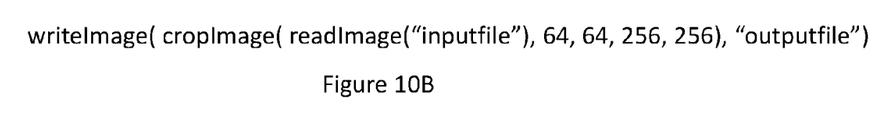
FIG. 10B is a functional description of a series of image operations that are performed to create the output image of FIG. 10A from its input image.

FIG. 10B shows an exemplary functional description of the operations of FIG. 10A, where the JPEG reader corresponds to a function readImage( ) the crop filter corresponds to a function cropImage( ) and the JPEG writer corresponds to a function writeImage( ) As can be seen from FIGS. 10A and 10B, by tracking the arguments that are passed to each filter, and by tracking what results are received from each filter, the system is able to convert from the coordinates of the original image(s), through any intermediate steps, to the resulting sub-portion. The functional description shows that the writeImage( ) function takes in as an input a dynamically generated result of the cropImage( ) which in turn takes in a dynamically generated result of the readImage( ) function. Accordingly, the system internally allocates room for and tracks the results of each of the steps so that they can be passed as input to subsequent steps. Each of the dynamically generated results is referenced by a dynamically assigned, unique identifier.

Figure 10C:
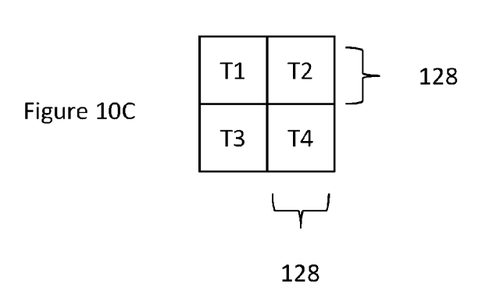
FIG. 10C is a block diagram showing exemplary tiles created for the output image of FIG. 10A to allow for parallel processing.

To utilize the parallelization of the system, the sub-portion is preferably broken down into a number of tiles, each of which will be processed separately. The system may be instructed to use a particular tile size or may determine what the tile size should be from what the resulting sub-portion size is to be. As shown in FIG. 10C, if a tile size was set to be or determined to be 128×128, then the resulting sub-portion of FIGS. 10A and 10B will consist of 4 separate tiles (shown as T1, T2, T3, and T4), each of which should undergo the processing steps of FIG. 10A (i.e., read, crop and write). Using the exemplary 256×256 output image, the four tiles will have locations (relative to the completed sub-portion) of (0,0), (128,0), (0,128) and (128,128), respectively. The system then performs a reverse coordinate transformation to determine the coordinates of each resulting step so that the tiles can be processed using their respective coordinates.

For example, each tile is initially associated with a corresponding region of interest (e.g., R1, R2, R3 and R4 which are associated with tiles T1, T2, T3 and T4, respectively) which acts as an information holder for describing the processing that is to be done in the pipeline. The initial ROIs are assigned the same coordinate system as their respective tiles, so the ROIs will have locations (relative to the completed sub-portion) of (0,0), (128,0), (0,128) and (128,128), respectively. The system then traverses back up the tree of operations to reverse the effect of operation on the coordinate system relative to the original image's coordinate system. The first such transformation in the example is the transformation from the crop stage to the sink stage results in a new set of regions of interest (e.g., R1a, R2a, R3a, and R4a, respectively), and the transformation is a trivial transformation since the image size at the sink and the crop stage are the same. So, the resulting new regions of interest are also 128×128, and at locations (0,0), (128,0), (0,128) and (128,128), respectively.

The next transformation is the transformation from the crop stage to the source stage. This transformation results in a new set of regions of interest (e.g., R1*b*, R2*b*, R3*b*, and R4*b*, respectively), which still have sizes 128×128, but the locations of those ROIs is relative to the original image. Thus, the resulting ROIs (e.g., R1*b*, R2*b*, R3*b*, and R4*b*, respectively) are all shifted by the original crop point (64, 64) and have locations of (64, 64), (192, 64), (64, 192) and (192, 192). The system can then put into four corresponding tokens the operations that are to be performed on the image to convert the image from the original source image to the resulting sub-portion. In this example, all tiles are of the same size (128×128). The first token contains the instructions for generating the tile at coordinates (64, 64), the second has instructions for the tile at (192, 64), the third for the tile at (64, 192), and the fourth for the tile at (192, 192). To process all four tokens, a pipeline is created containing five filters. The first filter is the token iterator which uses the token queue to feed each of the four tokens, in turn, to the rest of the pipeline. The second filter contains the source, the third contains the crop, and the fourth contains the sink. The fifth and last filter is the token destructor, which destroys the given token. Each token is passed from filter-to-filter sequentially, but the pipeline can process multiple tokens concurrently (e.g. at the same time).

Figure 11A:
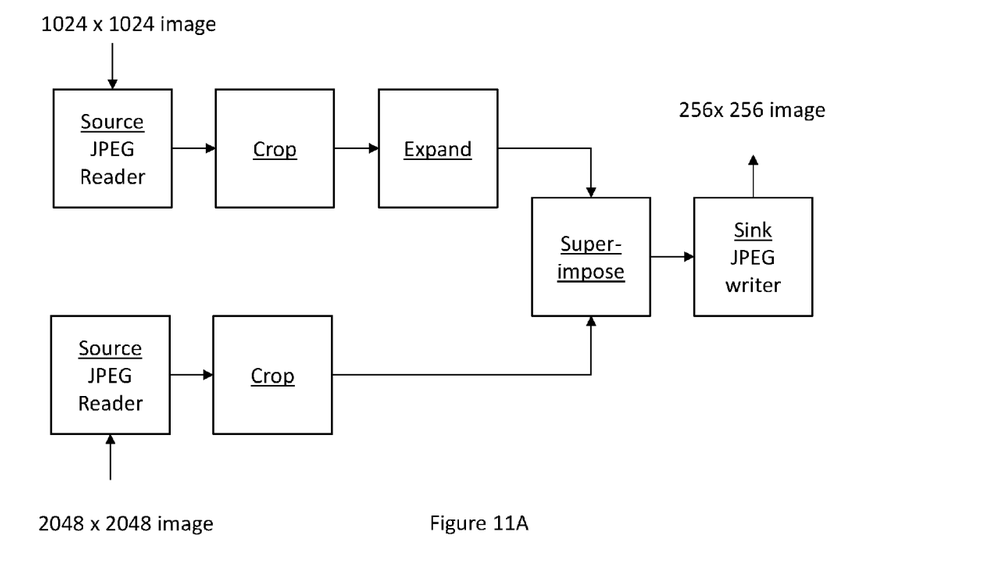
FIG. 11A is a block diagram showing an exemplary processing of two input images of differing resolutions to an output image.
Figure 11B:
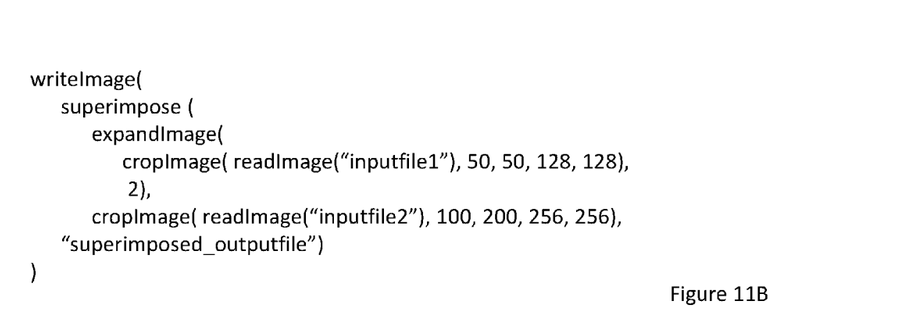
FIG. 11B is a functional description of a series of image operations that are performed to create the output image of FIG. 11A from its input images.

As shown in FIG. 11A, a set of image processing steps may utilize more than one set of input images. For example, two JPEG readers each read a corresponding image, which need not be the same size or resolution. One exemplary image is a 1024×1024 image while the other image is a 2048×2048 image. In a case where these images represent two different kinds of sensed data (e.g., red-green-blue (RGB) versus infrared (IR)), the resolution of the images may not be the same, even if the two images cover the same extent. Thus, if two such images are to be cropped to show a particular image feature and superimposed, the number of steps to process each image will not be the same. Assuming that the RGB image is the 2048×2048 image and the IR image is the 1024×1024 image and that those images cover the same extent for at least the image feature that is to be examined, then to superimpose those images at a particular location (e.g., 100, 200 in the RGB image), at least two processing steps will need to be performed on the RBG image and at least three processing steps will need to be performed on the IR image. For the RBG image, the source needs to be read (e.g., using readImage( ), and the cropImage( ) function needs to be performed to create a cropped image (e.g., extent 256×256). However, the IR image may be centered on a different location (e.g., such that point (50, 50) in the IR image corresponds to the point (100, 200) in the RGB image), so it may need to be read (e.g., using readImage( ), and the cropImage( ) function needs to be performed to create a cropped image but only of half the extent (e.g., extent 128×128) if the IR resolution is one-fourth of the RGB resolution. Then, to allow the IR image to be superimposed on the RGB image, the cropped IR image would have to be expanded (e.g., using the expandImage( ) function) to twice its original size. The two image parts would then be joined using (e.g., the superimpose( ) function) and the results output using the JPEG writer. As can be seen, the branch of the processing tree that reads the 1024×1024 image would therefore have a maximum depth of 4 and the branch of the processing tree that reads the 2048×2048 image would have a maximum depth of 3. FIG. 11B shows a functional equivalent of the processing tree of FIG. 11A. As the resulting image has an extent of 256×256 in the example of FIG. 11A, the processing could similarly be parallelized such that four 128×128 tiles are used within the token queue.

Similar to the reverse transformation process described above with respect to FIGS. 10A and 10B, the coordinate system transformations of each of the steps can be tracked so that the processing of each of the tiles can be described with respect to the original coordinate systems of the original images. Each of the tiles would then be associated with a token in the resulting token queue, where each token would correspond with the full processing to be performed for its sub-portion of the image.

Figure 12A:
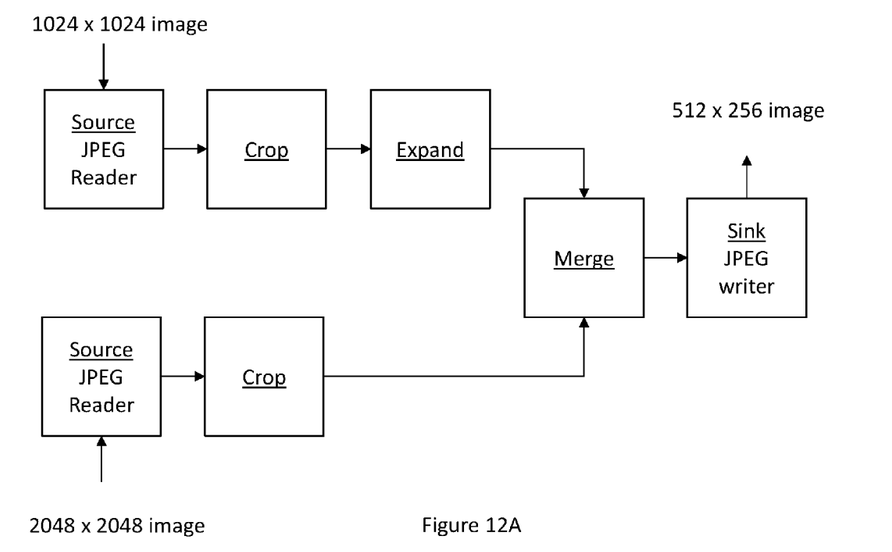
FIG. 12A is a block diagram showing an exemplary processing of two input images of different resolutions to an output image having side-by-side components.
Figure 12B:
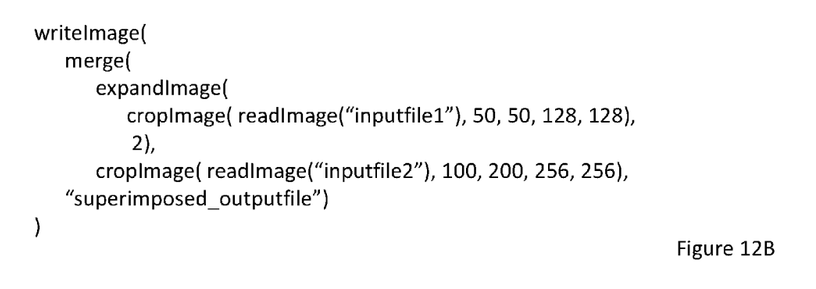
FIG. 12B is a functional description of a series of image operations that are performed to create the output image of FIG. 12A from its input images.
Figure 12C:
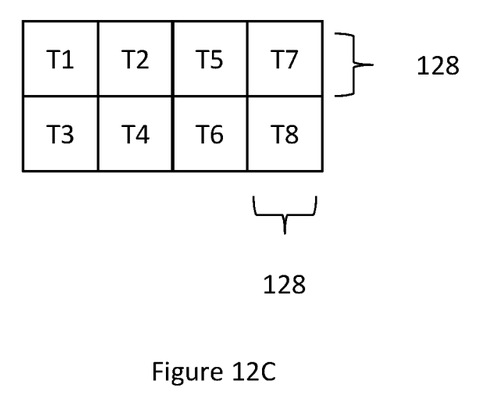
FIG. 12C is a block diagram showing exemplary tiles created for the output image of FIG. 12A to allow for parallel processing.

As shown in FIGS. 12A and 12B, like with Figured 11A and 11B, two input images of differing resolutions can be used to create a resulting output image. However, unlike the resulting superimposed image of FIG. 11A, the resulting output image of FIG. 12A is a side-by-side comparison of its corresponding parts from the original input images. For example, the two images may be satellite images taken at different times of the same location, and the co-located images are being placed side-by-side (e.g., with the first image on the left and the second image on the right) to allow an operator to see how a particular location has changed over time. Assuming that a tile size of 128×128 was used in the parallelization of FIG. 12A, 8 tiles would be generated by the system to cover the 512×256 combined image. For example, FIG. 12C shows the eight tiles of the 512×256 image resulting of FIGS. 12A and 12B. The tiles T1-T4 correspond to the tiles having had data read from "inputfile1" as part of the "upper branch" of FIG. 12A. The tiles T5-T8 correspond to the tiles having had data read from "inputfile2" as part of the "lower branch" of FIG. 12A. As a result, unlike the processing of FIGS. 10A, 10B, 11A and 11B, for some tokens there are some steps in the pipeline that do not have any substantive processing to do as the steps are for "empty" regions of interest. For example, when the token corresponding to tile T1 is processed, the system will read the portion of "inputfile1" corresponding to tile T1 when the token is passed to the filter for reading from source "inputfile1". However, when the token is passed to the filter for reading from source "inputfile2", then the system can treat the request to be a "null" operation as no part of "inputfile2" is ultimately used in tile T1. Similarly, when the token is passed to the filter for performing the crop of the result of the read from "inputfile2", then the system will treat that request as a "null" operation also as there is no image to crop. As a result, the token will really only have undergone the processing of the upper branch, even though the token has passed through all of the filters for the flattened pipeline.

The parallel image processing system described above can be implemented using a variety of embodiments that utilize varying amounts of circuitry and programmable instructions. In one embodiment, the parallel processing is performed using general-purpose circuitry having multiple similar processing engines (e.g., a processor such as a microprocessor that has plural cores, a system-on-a-chip with multiple processors, a custom processor, etc.) that accesses at least one computer memory containing program instructions designed to partition the image processing steps into a series of parallel steps and then to perform those steps in parallel, either on the same or a different processor system than the one that performed the parallelization. The at least one computer memory storing the program instructions may be either rewritable memory or a one-time programmable memory. In addition, a processor-based system typically also includes an external rewritable memory for storing temporary results during the execution of the program instructions, although it is possible to utilize only internal rewriteable memory for the storage of those temporary results. As would be understood by those of ordinary skill in the art, the number of steps performed by each processor is a matter of design choice related to factors such as, but not limited to, initial design cost, reprogrammability, speed, extensibility, etc.

A number of the components described herein can be implemented using object-oriented memory structures and their corresponding computer-implemented instructions (e.g., using a C++ class with its data members and functions). For example, a token can be implemented to include at least a tile cache and tile instructions. A tile cache acts as a cache (container) of image tiles. The tiles are created while rendering (running the pipeline) based on the information stored in the token queue. This tile cache is initially empty. Sources add the initial tiles (likely read from a disk file). Each operator pulls out the tile(s) that they need to perform their work from this cache. Operators then push a new intermediate tile back into the cache as a result of whatever work they did.

A token also includes a "tile instructions" composite class containing the information generated during the pre-render phase. The instructions are the information necessary to produce a single final output tile. The tile instructions class may be implemented to include a number of helper functions that aid in the utilization of tokens. Four exemplary member functions are: (1) NextTileIDO, (2) TileIDtoRequiredTileIDs( ) (3) TileIDtoROI( ) and (4) OperatorIDtoTileIDs( ).

The method NextTileID( ) provides the next identifier/key available for use to uniquely identify a tile. By using this routine, no two tiles will ever have the same TileIDs. Use of this method may have to be atomic so that it is not call twice at the same time in a multi-core or multi-processor environment. Tiles are inserted and pulled from the tile cache using previously issued identifier (which acts as a key).

The method TileIDtoRequiredTileIDs( ) maps an intermediate tile ID to a set of required tile IDs. This is used to track what tiles are required to generate each operator's intermediate result tiles. In order to generate these intermediate result tiles, other intermediate tile(s) may be required. The ID of the intermediate tile being generated is used as the key to return the IDs of its required tiles.

The method TileIDtoROI( ) maps a tile ID to a region-of-interest. For each intermediate tile to be generated, this is the ROI corresponding to the tile. The ROI is specific to the operator generating the intermediate tile.

The method OperatorIDtoTileIDs( ) maps an operator's ID to the intermediate tiles that it is responsible for creating. This tile ID is used to retrieve the ROI for the intermediate tile to be created by the operator. This tile ID is also used to retrieve the IDs of the tiles required to create the operator's intermediate tile. The required tiles are pulled from cache in order for the operator to perform its work.

Additional image processing filters/operators besides those described herein can also be used with the image processing system described herein. For example, other image transformations (e.g., rotations, translations, skews, warping) can be performed, as long as the operator includes information enabling a reverse transformation of the coordinate transformation from the source to the sink (thereby creating a reverse transformation in the direction of the sink to the source).

While certain configurations of structures have been illustrated for the purposes of presenting the basic structures of the present invention, one of ordinary skill in the art will appreciate that other variations are possible which would still fall within the scope of the appended claims.

The invention claimed is:

1. A computer system for controlling processing of at least one input image to produce at least one output image by processing, in parallel, portions of the at least one input image to produce the at least one output image, the computer system comprising:
   at least one processor;
   at least one non-transitory computer readable medium for storing computer-implementable instructions, the computer-implementable instructions for controlling the at least one processor, wherein the computer-implementable instructions comprise:
     computer code to determine a series of operations to be performed on the at least one input image to produce the at least one output image;
     computer code to order the series of operations to be performed on the at least one input image into an ordered series of parallelizable operations where operations of the series of operations that need results of other operations of the series of operations are ordered such that they are performed after operations of the series of operations on which they rely;
     computer code to determine coordinate transforms for the ordered series of operations from a perspective of the at least one output image back to the at least one input image;
     computer code to determine a tile size for partitioning the at least one output image into plural image tiles; and
     computer code to convert the ordered series of parallelizable operations to be performed on the at least one input image to produce the at least one output image into plural series of ordered parallelizable operations to be performed on image tiles to produce the plural image tiles from the at least one input image.

2. The computer system as claimed in claim 1, further comprising computer code to place the plural series of ordered parallelizable operations into a pipeline which receives tokens from a token queue.

3. The computer system as claimed in claim 2, improvement further comprising:
   computer code to place a token iterator in the pipeline before the plural series of ordered parallelizable operations to be performed, and
   computer code to place a token destructor in the pipeline after the plural series of ordered parallelizable operations to be performed.

4. The computer system as claimed in claim 1, wherein the computer code to determine a tile size for partitioning the at least one output image into plural image tiles comprises:
   computer code to determine a size of the at least one output image; and
   computer code to select the tile size from a set of predetermined tile sizes and the size of the at least one output image.

5. The computer system as claimed in claim 1, wherein the computer code to determine a tile size for partitioning the at least one output image into plural image tiles comprises:
   computer code to determine an image format in which the at least one output image is to be saved; and
   computer code to determine a tile size supported by the image format in which the at least one output image is to be saved.

6. The computer system as claimed in claim 1, wherein the computer code to determine a tile size for partitioning the at least one output image into plural image tiles comprises:
- computer code to determine a size of the at least one output image; and
- computer code to select the tile size based on the size of the at least one output image and a number of rows and a number of columns of tiles to be used, wherein the number of rows is greater than one and the number of columns of tiles is greater than one.

7. The computer system as claimed in claim 1, further comprising computer code to combine the plural image tiles into the at least one output image.

8. The computer system as claimed in claim 1, wherein the series of operations comprises at least one of image cropping, image expansion, image filtering, image translation, image rotation, image skewing and image warping.

9. The computer system as claimed in claim 1, wherein the computer-implementable instructions further comprise computer code to execute a portion of the plural series of ordered parallelizable operations in parallel on the at least one processor to produce the plural image tiles from the at least one input image.

10. The computer system as claimed in claim 1, further comprising a multi-core processor configured to execute a portion of the plural series of ordered parallelizable operations in parallel to produce the plural image tiles from the at least one input image.

11. A computer-implemented method for controlling processing of at least one input image to produce at least one output image, the method executing computer-implementable instructions stored in at least one non-transitory computer readable medium, the computer-implementable instructions for controlling at least one processor, wherein the method comprises:
- determining a series of operations to be performed on the at least one input image to produce the at least one output image;
- ordering the series of operations to be performed on the at least one input image into an ordered series of parallelizable operations where operations of the series of operations that need results of other operations of the series of operations are ordered such that they are performed after operations of the series of operations on which they rely;
- determining coordinate transforms for the ordered series of operations from a perspective of the at least one output image back to the at least one input image;
- determining a tile size for partitioning the at least one output image into plural image tiles; and
- converting the ordered series of parallelizable operations to be performed on the at least one input image to produce the at least one output image into plural series of ordered parallelizable operations to be performed on image tiles to produce the plural image tiles from the at least one input image.

12. The computer-implemented method as claimed in claim 11, further comprising placing the plural series of ordered parallelizable operations to be performed into a pipeline which receives tokens from a token queue.

13. The computer-implemented method as claimed in claim 12, further comprising:
- placing a token iterator in the pipeline before the plural series of ordered parallelizable operations to be performed, and
- placing a token destructor in the pipeline after the plural series of ordered parallelizable operations to be performed.

14. The computer-implemented method as claimed in claim 11, wherein determining a tile size for partitioning the at least one output image into plural image tiles comprises:
- determining a size of the at least one output image; and
- selecting the tile size from a set of predetermined tile sizes and the size of the at least one output image.

15. The computer-implemented method as claimed in claim 11, wherein determining a tile size for partitioning the at least one output image into plural image tiles comprises:
- determining an image format in which the at least one output image is to be saved; and
- determining a tile size supported by the image format in which the at least one output image is to be saved.

16. The computer-implemented method as claimed in claim 11, determining a tile size for partitioning the at least one output image into plural image tiles comprises:
- determining a size of the at least one output image; and
- selecting the tile size based on the size of the at least one output image and a number of rows and a number of columns of tiles to be used, wherein the number of rows is greater than one and the number of columns of tiles is greater than one.

17. The computer-implemented method as claimed in claim 11, further comprising combining the plural image tiles into the at least one output image.

18. The computer-implemented method as claimed in claim 11, wherein the series of operations comprises at least one of image cropping, image expansion, image filtering, image translation, image rotation, image skewing and image warping.

19. The computer-implemented method as claimed in claim 11, wherein the computer-implementable instructions further comprise computer-implementable instructions to execute a portion of the plural series of ordered parallelizable operations in parallel on multiple processors to produce the plural image tiles from the at least one input image.

20. The computer-implemented method as claimed in claim 11, wherein the computer-implementable instructions further comprise computer-implementable instructions to execute a portion of the plural series of ordered parallelizable operations in parallel on multiple cores of a single processor to produce the plural image tiles from the at least one input image.

* * * * *